(12) United States Patent
Klinglmair et al.

(10) Patent No.: US 9,243,976 B2
(45) Date of Patent: Jan. 26, 2016

(54) SENSOR BEARING ASSEMBLY WITH COVER MOUNTED SENSOR

(71) Applicant: AKTIEBOLAGET SKF, Gothenburg (SE)

(72) Inventors: Erich Klinglmair, Steyr (AT); Andreas Pichler, Steyr (AT); Frans Grove, Lansdale, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 445 days.

(21) Appl. No.: 13/677,903

(22) Filed: Nov. 15, 2012

(65) Prior Publication Data

US 2014/0130618 A1 May 15, 2014

(51) Int. Cl.
| | |
|---|---|
| *G01M 13/04* | (2006.01) |
| *F16C 33/72* | (2006.01) |
| *F16C 41/00* | (2006.01) |
| *F16C 33/58* | (2006.01) |
| *G01P 3/44* | (2006.01) |
| *F16C 33/78* | (2006.01) |
| *F16C 19/06* | (2006.01) |
| *F16C 19/26* | (2006.01) |

(52) U.S. Cl.
CPC .............. *G01M 13/04* (2013.01); *F16C 33/586* (2013.01); *F16C 33/723* (2013.01); *F16C 33/783* (2013.01); *F16C 41/007* (2013.01); *G01P 3/443* (2013.01); *F16C 19/06* (2013.01); *F16C 19/26* (2013.01); *F16C 33/7869* (2013.01)

(58) Field of Classification Search
CPC ........... F16C 32/00; G01P 3/48; G01M 13/04
See application file for complete search history.

(56) References Cited

U.S. PATENT DOCUMENTS

| | | | | | |
|---|---|---|---|---|---|
| 4,549,823 | A | * | 10/1985 | Nichting | 384/537 |
| 4,797,549 | A | * | 1/1989 | Ho et al. | 385/12 |
| 4,907,445 | A | * | 3/1990 | Okumura | 73/115.08 |
| 5,289,120 | A | * | 2/1994 | Moretti et al. | 324/174 |
| 5,393,146 | A | * | 2/1995 | Ishikawa et al. | 384/448 |
| 5,678,933 | A | * | 10/1997 | Ouchi et al. | 384/448 |
| 5,762,425 | A | * | 6/1998 | Ouchi | 384/448 |
| 5,975,761 | A | * | 11/1999 | Ouchi et al. | 384/448 |
| 6,422,075 | B1 | * | 7/2002 | Foster et al. | 73/494 |
| 7,931,406 | B2 | * | 4/2011 | Matsui et al. | 384/448 |
| 8,043,010 | B2 | * | 10/2011 | Kawamura et al. | 384/448 |
| 8,136,994 | B2 | * | 3/2012 | Masuda | 384/448 |
| 9,008,899 | B2 | * | 4/2015 | Nishikawa et al. | 701/34.4 |
| 2007/0145815 | A1 | * | 6/2007 | Swanson | 301/124.1 |
| 2008/0211293 | A1 | * | 9/2008 | Ai et al. | 301/105.1 |
| 2009/0285515 | A1 | * | 11/2009 | Kawamura et al. | 384/448 |
| 2013/0223778 | A1 | * | 8/2013 | Takahashi et al. | 384/448 |

* cited by examiner

*Primary Examiner* — Freddie Kirkland, III
(74) *Attorney, Agent, or Firm* — Garcia-Zamor IP Law; Ruy M. Garcia-Zamor

(57) ABSTRACT

A sensor bearing assembly for supporting a rotatable shaft includes a bearing having an inner ring disposable about the shaft, an outer ring disposed about the inner ring, and rolling elements between the rings. An annular detection member is coupled with the bearing inner ring and has an outer circumferential surface and a circular cover is configured to enclose the axial end of the shaft when the bearing assembly is mounted on the shaft. The cover includes a rim coupled with the bearing outer ring, a radially-extending end wall spaced axially from the shaft end, and an annular side wall extending axially between the end wall and the rim. A sensor is mounted to the cover side wall, has an inner end spaced radially outwardly from the detection member outer circumferential surface, and is configured to sense angular displacement of the detection member about the shaft central axis.

20 Claims, 6 Drawing Sheets

SENSOR BEARING ASSEMBLY WITH COVER MOUNTED SENSOR

BACKGROUND OF THE INVENTION

The present invention relates to bearings, and more particularly to bearing assemblies having a sensor for sensing displacement of a rotating shaft.

Sensor bearing assemblies are known and typically include inner and outer rings, a plurality of rolling elements disposed between the rings and at least one sensor. The inner ring is mounted on a rotatable shaft and the sensor detects rotation of the shaft or the inner ring. In certain applications, the axial ends of the shaft are required to be covered or enclosed, such that a cover is provided to enclose the shaft end and the bearing assembly.

In certain such devices, access to the sensor requires removal of the cover, which may be inconvenient and time-consuming. In other devices, the sensors are mounted to the end wall of the cover and must be carefully axially aligned with a radial surface of encoder. The sensors of such devices are difficult to install to ensure accurate sensing of shaft displacement and are prone to being broken-off of the cover, which may lead to costly down-time of the machine of which the shaft is a part.

SUMMARY OF THE INVENTION

In one aspect, the present invention is a sensor bearing assembly for supporting a shaft, the shaft being rotatable about a central axis and having an axial end. The sensor bearing assembly comprises a bearing including an inner ring disposable about the shaft to mount the bearing assembly upon the shaft, an outer ring disposed about the inner ring, and a plurality of rolling elements disposed between the inner and outer rings. A generally annular detection member is coupled with the bearing inner ring and having an outer circumferential surface and a generally circular cover is configured to enclose the axial end of the shaft when the bearing assembly is mounted on the shaft. The cover includes a rim coupled with the bearing outer ring, a generally radially-extending end wall spaced axially from the shaft end, and a generally annular side wall extending generally axially between the end wall and the rim. Further, at least one sensor is mounted to the cover side wall, has an inner end spaced radially outwardly from the detection member outer circumferential surface, and is configured to sense angular displacement of the detection member about the shaft central axis.

In another aspect, the present invention is again a sensor bearing assembly for supporting a shaft, the shaft being rotatable about a central axis and having an axial end. The sensor bearing assembly comprises a bearing including an inner ring disposable about the shaft to mount the bearing assembly upon the shaft and having an axial extension portion, an outer ring disposed about the inner ring and having a radially outwardly extending annular flange, and a plurality of rolling elements disposed between the inner and outer rings. A generally annular detection member is mounted on the axial extension portion of the bearing inner ring and has an outer circumferential surface. A generally circular cover is configured to enclose the axial end of the shaft when the bearing assembly is mounted on the shaft. The cover includes a generally circular rim coupled with the bearing outer ring, a generally circular, generally radially-extending end wall spaced axially from the shaft end, and a generally tubular side wall having a first end connected with the end wall and a second end, the rim extending radially outwardly from the rim and being attached to the bearing outer ring flange. Further, at least one sensor is mounted to the cover side wall, has an inner end spaced radially outwardly from the detection member outer circumferential surface, and is configured to sense angular displacement of the detection member about the shaft central axis. The cover side wall further has at least one sensor mount configured to position the at least one sensor with respect to the detection member, the at least one sensor being removably attached to the sensor mount.

In a further aspect, the present invention is a device comprising a shaft rotatable about a central axis and having an axial end. A bearing includes an inner ring disposable about the shaft to mount the bearing upon the shaft, an outer ring disposed about the inner ring, and a plurality of rolling elements disposed between the inner and outer rings. A generally annular detection member is coupled with the bearing inner ring and has an outer circumferential surface. A generally circular cover is configured to enclose the axial end of the shaft when the bearing is mounted on the shaft. The cover includes a rim coupled with the bearing outer ring, a generally radially-extending end wall spaced axially from the shaft end, and a generally annular side wall extending generally axially between the end wall and the rim. Further, at least one sensor is mounted to the cover side wall, has an inner end spaced radially outwardly from the detection member outer circumferential surface, and is configured to sense angular displacement of the detection member about the shaft central axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
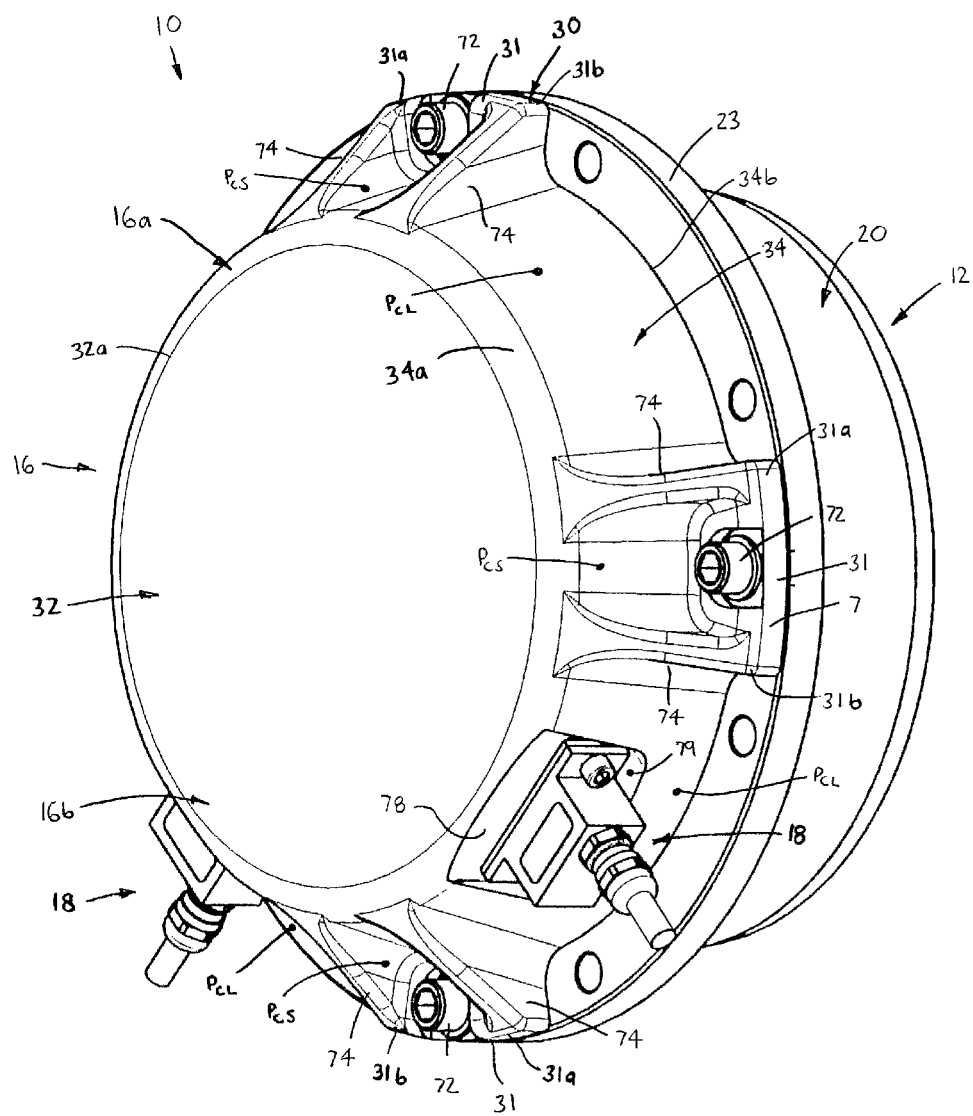
FIG. 1 is perspective view of a sensor bearing assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a sensor bearing assembly 10 for supporting a shaft 1, the shaft 1 being rotatable about a central axis $A_S$ and having an axial end 1a. In a presently preferred application, the bearing assembly 10 is used with a shaft 1 that is incorporated into a traction drive motor (not shown) for an oil rig (not shown), but may alternatively be utilized in any other appropriate rotary shaft application. Basically, the sensor bearing assembly 10 comprises a bearing 12, a detection member 14 coupled with the bearing 12, a cover 16 connected with the bearing 12, and at least one sensor 18 mounted on the cover 16. The bearing 12 has a central axis $A_B$ (collinear with the shaft axis $A_S$ when installed) and includes an inner ring 20 disposable about the shaft 1, so as to mount the bearing assembly 10 upon the shaft 1, and an outer ring 22 disposed circumferentially and coaxially about the inner ring 20. A plurality of rolling elements 24 are disposed between and rotatably couple the inner and outer rings 20, 22, which may be spherical balls 26 (FIGS. 2 and 4), cylindrical rollers 28 (FIGS. 3 and 5), or any other type of rolling element 24. The detection member 14 is generally annular and has opposing axial ends 14a, 14b and inner and outer circumferential surfaces 15A, 15B, respectively. The detection member 14 is coupled with the bearing inner ring 20 so as to be angularly displaceable with the shaft 1, to thereby provide an indication of the angular position of the shaft 1 about the axis $A_S$, as described below.

Further, the cover 16 is generally circular and is configured to enclose the axial end 1a of the shaft 1 when the bearing assembly 10 is mounted on the shaft 1, as described in detail below. Specifically, the cover 16 includes a rim 30 coupled with the bearing outer ring 22 and a generally radially-extending end wall 32 spaced axially from the shaft end 1a and from the rim 30. A generally annular side wall 34 extends generally axially between the end wall 32 and the rim 30 and is disposed generally coaxially about the shaft end 1a when the bearing assembly 10 is mounted on the shaft 1. Furthermore, at least one and preferably two sensors 18 are mounted to the cover side wall 34. Each sensor 18 has an inner end 18a spaced radially outwardly from the detection member outer circumferential surface 15, an outer end 18b spaced radially outwardly from the inner end 18a, and a centerline $C_S$ extending generally radially between the inner and outer ends 18a, 18b. Preferably, each sensor 18 is arranged on the cover 16 such that the centerline $C_S$ generally intersects the shaft axis $A_S$, and is thus positioned radially and axially spaced from (i.e., "inboard" of) the end wall 32 of the cover 16.

Furthermore, each sensor 18 is configured to sense angular displacement of the detection member 14 about the shaft central axis $A_S$, thereby sensing angular displacement of the shaft 1 about the axis $A_C$. Depending on the subsequent processing of the output signals from the sensor(s) 18, the detected shaft angular displacement may be used to determine angular position, total angular displacement, and/or angular velocity of the shaft 1. Thus, the present sensor bearing assembly 10 provides the capability of detecting angular motion of the shaft 1 using sensor(s) 18 that, due to mounting on the cover sidewall 34, are less prone to damage and easily accessible and replaceable in the event of damage thereto, as discussed in detail below. Having described the basic structure and functions above, these and other components of the bearing assembly 10 are discussed in further detail below.

Figure 2:
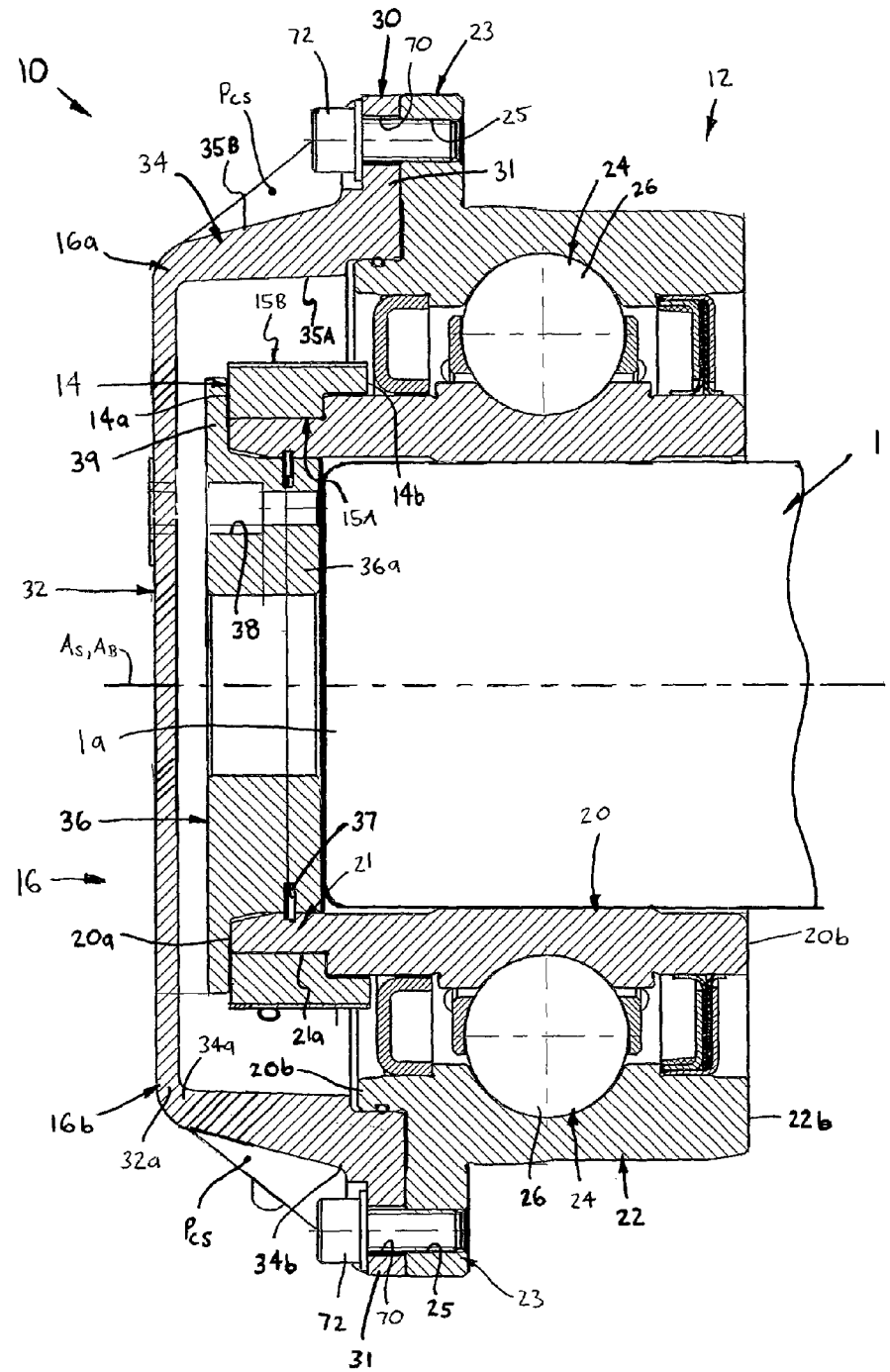
FIG. 2 is an axial cross-sectional view of the sensor bearing assembly, showing a bearing with ball rolling elements.
Figure 3:
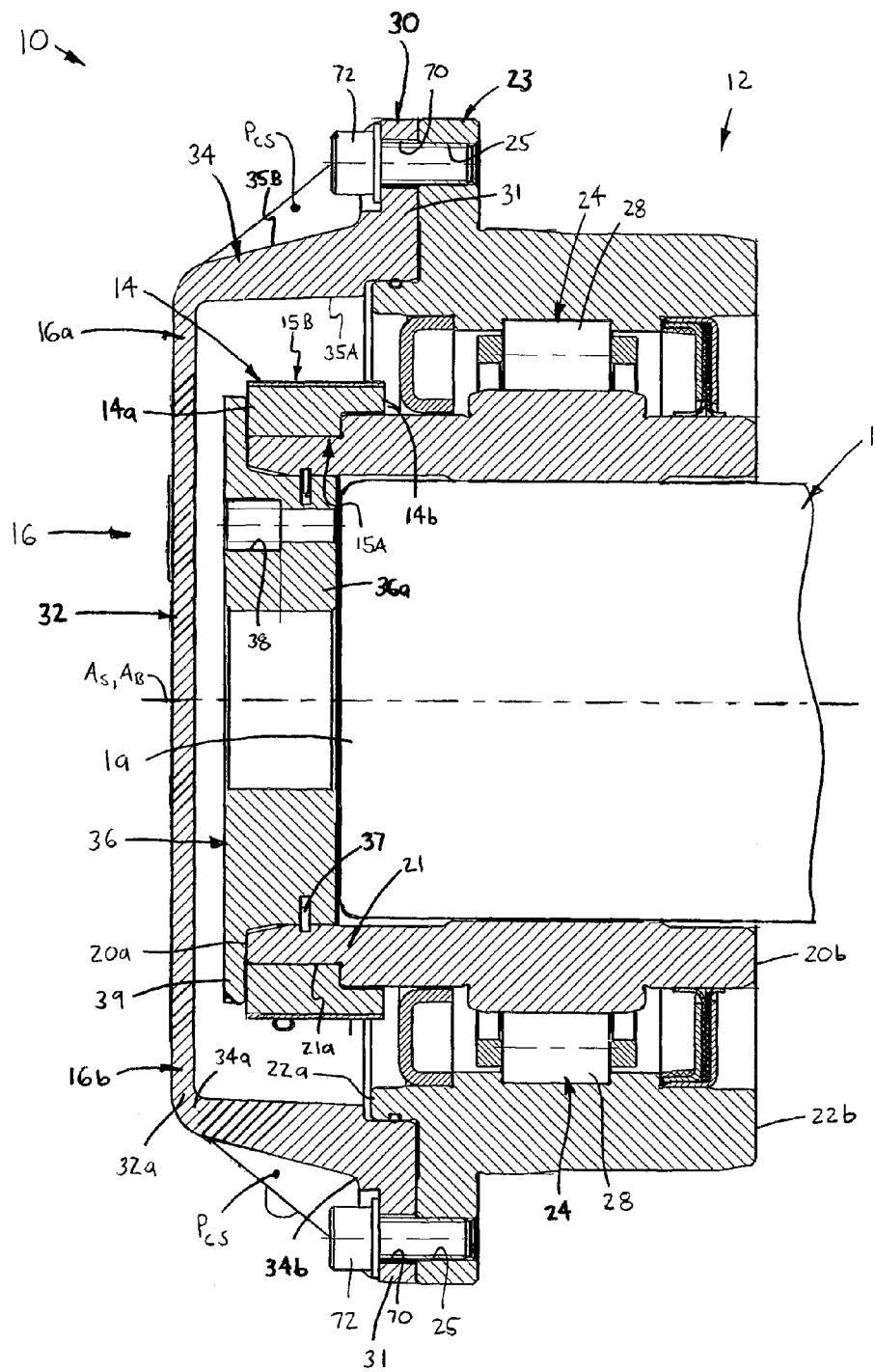
FIG. 3 is an axial cross-sectional view of the sensor bearing assembly, showing a bearing with cylindrical rolling elements.

Referring to FIGS. 2 and 3, the bearing 12 is preferably a generally conventional rolling element bearing, with certain additional structural features, as described below. Each of the inner and outer rings 20, 22 has first and second axial ends 20a, 20b and 22a, 22b, respectively. The second, axially-inner or inboard ends 20b, 22b of the two rings 20, 22 are generally radially aligned, but the first end 20a of the inner ring 20 is spaced axially-outwardly from the first end 22a of the outer ring 22, so as to define an axial extension portion 21 on the inner ring 20. The inner ring extension portion 21 is configured to receive the detection member 14; specifically, the inner ring 20 has an outer circumferential surface 21a sized to fit within a circular bore 44 of the detection member 14, as described below. Further, the bearing outer ring 22 includes a radially-outwardly extending annular flange 23 connectable with the cover rim 30. More specifically, the flange 23 preferably includes a plurality of threaded holes 25 circumferentially spaced about the bearing axis $A_B$, each hole 25 receiving a separate threaded fastener 72 to removably attach the cover 16 to the bearing 10, as described below.

Preferably, the sensor bearing assembly 10 further comprises a generally circular end cap 36 connectable with the shaft end 1a so as to attach the bearing inner ring 20, and thereby the sensor bearing assembly 10, to the shaft 1. The end cap 36 has a primary portion 36a sized to fit within a central bore 27 of the inner ring 20, so as to be disposed within the ring extension portion 21, and is coupled to the inner ring 20 by a circular retainer 37 (e.g., a Circlip or snap ring). The end cap 36 has a plurality of mounting holes 38 (only one shown) for receiving a portion of a threaded fastener (none shown) to removably attach the cap 36 to the shaft end 1a. Further, the end cap 36 has a radially-outwardly extending flange 39 disposable against the first, outer end 20a of inner ring and a first axial end 14a of the detection member 14. With this structure, the end cap 36 serves to both retain the inner ring 20 (and thus the entire bearing 12) on the shaft 1 and to retain the detection member 14 on the inner ring extension portion 21 when the cap 36 is attached to the shaft 1. Although depicted in the drawing figures as a one-piece structure, the end cap 36 may alternatively be formed as an assembly of inner and outer circular disks (not depicted) removably connected together so as to facilitate assembly and disassembly within the inner ring central bore 27.

Figure 4:
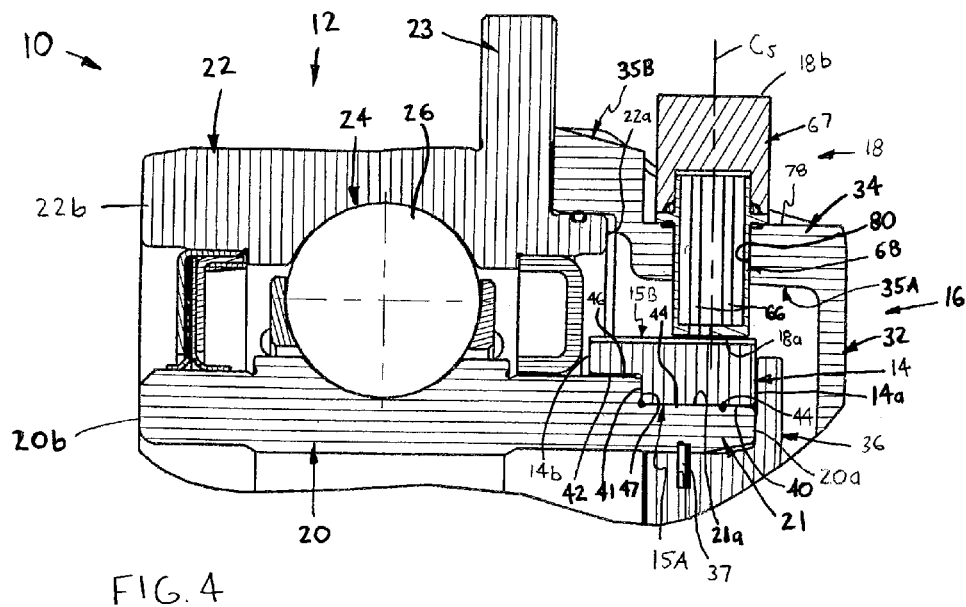
FIG. 4 is a broken-away, enlarged view of a portion of FIG. 2.
Figure 5:
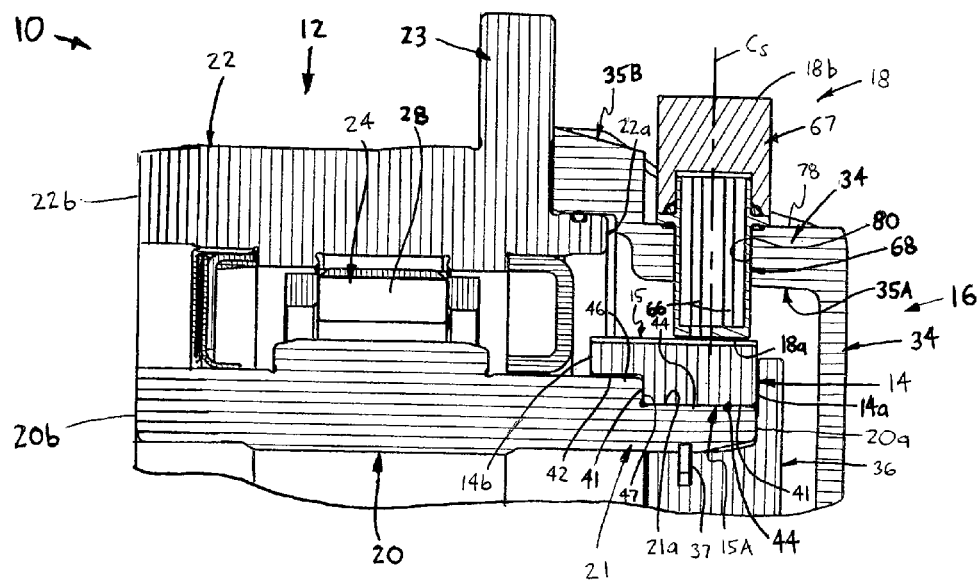
FIG. 5 is a broken-away, enlarged view of a portion of FIG. 3.
Figure 6:
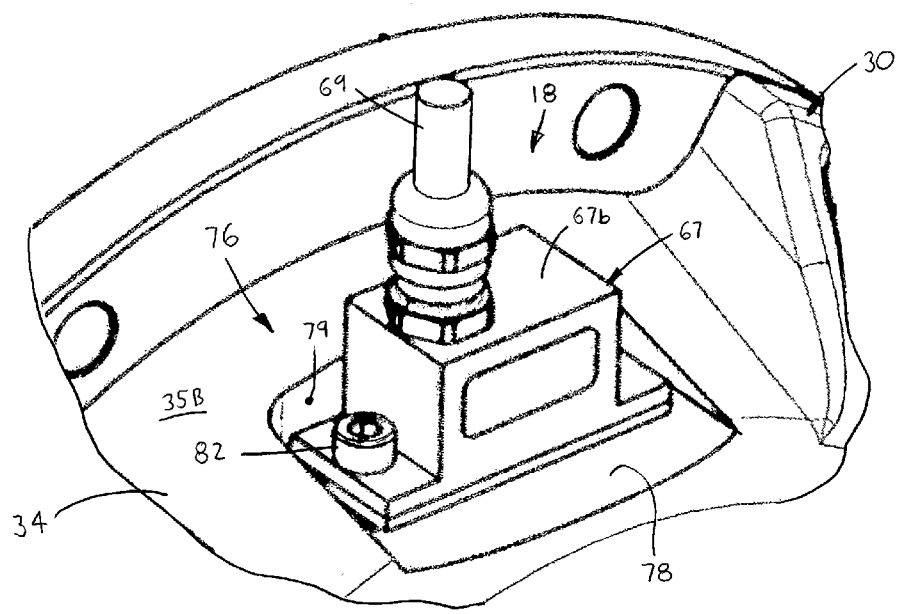
FIG. 6 is a broken-away perspective view of a portion of the sensor bearing assembly, showing a sensor of the sensor bearing assembly.

Referring to FIGS. 2-4, the detection member 14 is configured to be mountable on the extension portion 21 of the bearing inner ring 20 so as to be positioned for interaction with the cover-mounted sensor(s) 18. Specifically, the detection member inner surface 15A is preferably "stepped", i.e., having a radially-smaller and a radially-larger inner circumferential surface section 40, 42, respectively, and a radial "shoulder" surface section 41 extending between the circumferential surface sections 40, 42, the three surfaces 40, 41, 42 thereby defining a counter bore 44, as indicated in FIGS. 4 and 5. The outer surface 21a of the inner ring extension portion 21 has corresponding outer circumferential surfaces 45, 46 and a radial surface 47, as is also indicated in FIGS. 4 and 5. With this complementary surface structure, the detection member 14 is positioned at a desired axial location with respect to the shaft 1 (and also with respect to the cover 16), when the detection member radial surface 41 and the inner ring extension radial surface 47 are abutting or juxtaposed.

Figure 8:
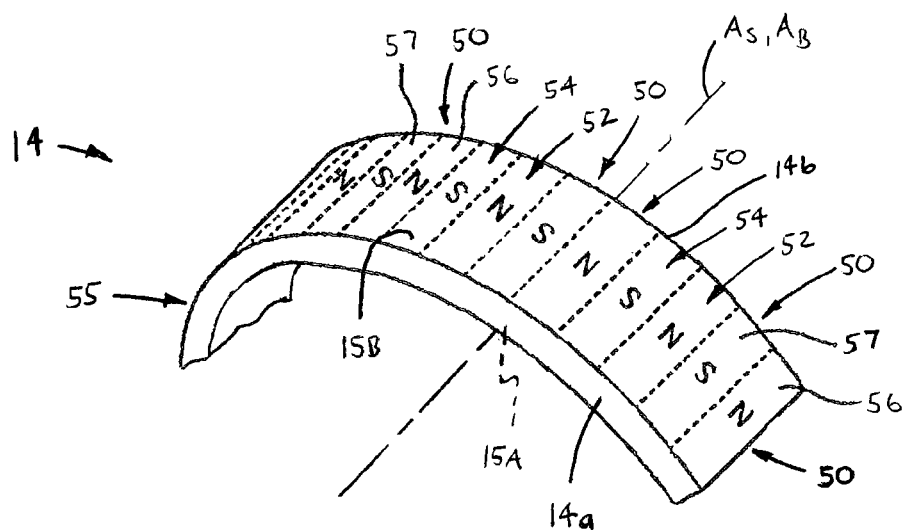
FIG. 8 is a broken-away perspective view of a portion of a detection member of the sensor bearing assembly, showing a pattern of magnetic pole indicators.
Figure 9:
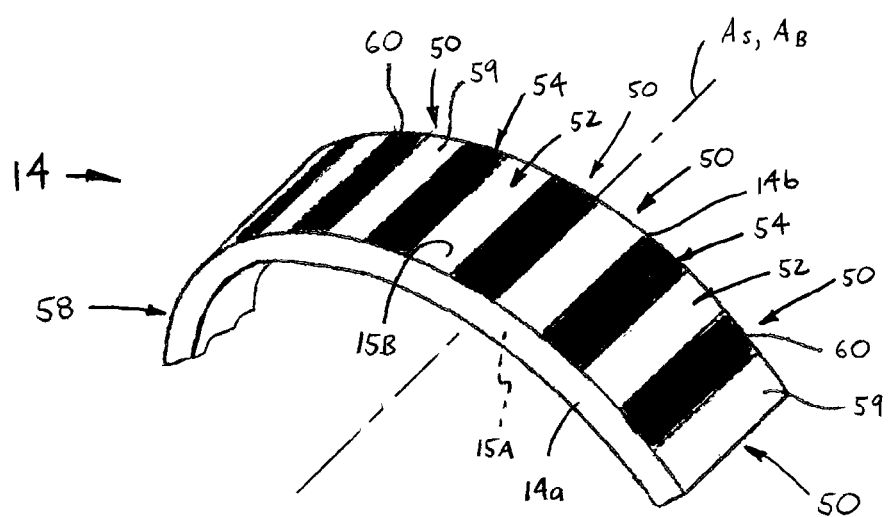
FIG. 9 is a broken-away perspective view of a portion of a detection member of the sensor bearing assembly, showing an alternative pattern of optical indicators.

As depicted in FIGS. 8 and 9, the detection member 14 further has a plurality of indicators 50 spaced circumferentially about the member outer surface 15B, with each indicator 50 corresponding to a separate angular position of the detection member 14 about the central axis 1A. With such indicators 50, the sensor 18 is configured to generate an output when any one of the indicators 50 displaces generally adjacent to the sensor inner end 18a. The output of the sensors 18 is used to determine shaft angular position, angular displacement or/and shaft rotational speed. Preferably, the plurality of indicators 50 includes an alternating pattern of first and second indicators 52, 54 spaced apart about the axis $A_B$ such that each first indicator 50 is disposed between a separate pair of adjacent second indicators 54 and each second indicator 54 is disposed between a separate pair of adjacent first indicators 52.

With two such sets of indicators 52, 54, the sensor 18 is preferably configured to generate a first output when a first indicator 52 displaces adjacent to the sensor inner end 18a and a second output when a second indicator 54 is displaces adjacent to the sensor end 18a. Alternatively, the sensor 18 may be configured to generate an output only when one type of indicator 52 or 54 moves adjacent to the sensor end 18a. In other words, the sensor 18 generates an output either when any one of the first indicators 52 displaces adjacent to the sensor inner end 18a or when any one of the second indicators 54 displaces adjacent to the sensor end 18a, but not when one of the other type of indicator 54, 52 moves proximal to the end 18a. Most preferably, the detection member 14 is formed as a known magnetic pulse ring or encoder ring 55 having a plurality of pairs of alternating north and south magnetic poles 56, 57, as depicted in FIG. 8. Alternatively, the detection member 14 may be formed in any other appropriate manner that provides the capability of indicating angular position of the bearing inner ring 20 (and thus the shaft 1), such as for example, as an optical encoder ring 58 with an optical pattern of alternating transparent or opaque areas 59, 60 (FIG. 9) or as a toothed wheel or gear (not shown), in which each tooth provides a first indicator 52 and each gap provides second indicator 54.

Referring to FIGS. 4-7, each sensor 18 is preferably a Hall Effect sensor 64 including at least one and preferably two printed circuit boards (PCBs) 66 each containing at least one semi-conductor (not indicated) configured to generate an output voltage when exposed to a changing magnetic field, specifically a transition between a north pole 56 and a south pole 57 during rotation of the preferred detection member 14. Most preferably, each sensor 18 includes a main body or base 67 attachable to the side wall 34, an inner portion 68 consisting of the two PCBS 66 extending from the inner end 67a of the base 67, and one or more electric cables 69 extending from the outer end 67b of the base 67 for transmitting the sensor output. However, the sensor 18 may be constructed in any other appropriate manner (e.g., single PCB) and/or be any other appropriate type of sensor for determining the angular position of the detection member 14 based on the indicator(s) 50. For example, each sensor 18 may include a photo detector (not shown) for receiving light from a light source passing through an optical pattern of transparent and opaque areas 59, 60.

Referring now to FIGS. 1-3, the cover 16 is preferably generally circular and defines an internal cavity 17 for receiving and enclosing the inner end 1a of the shaft 1, and thereby also enclosing the inner ring axial end portion 21 and the detection member 14 mounted thereon. The cover end wall 32 is preferably formed as a generally thin, circular plate that extends substantially radially (as opposed to being partially curved or bended axially) and has an inner radial surface 33 and a circular outer perimeter 32a. The side wall 34 is preferably generally tubular and has a first axial end 34a connected with the end wall outer perimeter 32a, an opposing second axial end 34b, and inner and outer circumferential surfaces 35A, 35B, respectively. Thus, the cover internal cavity 17 is defined between the end wall inner radial surface 33 and the side wall inner circumferential surface 35A.

Further, the cover rim 30 preferably includes at least one and preferably four flanges 31 (only three shown) extending generally radially from the side wall second axial end 34a, the four flanges 31 being spaced apart circumferentially about the bearing axis $A_B$, as best shown in FIG. 1. Alternatively, the rim 30 may be formed as a single, continuous annular flange (not shown). With the preferred four flanges 31, each flange 31 is generally arcuate and has opposing circumferential ends 31a, 31b and a mounting hole 70 (FIGS. 2 and 3) generally centered between the ends 31a, 31b. Each rim mounting hole 70 is alignable with a separate threaded hole 25 of the bearing outer ring flange 23 and receives a separate threaded fastener 72. As such, the fasteners 72 removably attach the rim 30, and thereby the entire cover 16, with the bearing outer ring 22. However, the rim 30 (or the sidewall 34) may alternatively be removably mounted to the bearing outer ring flange 23, or another portion of the outer ring 22, by any other appropriate means, such as for example, one or more keys, detent pins, clips, clamping devices, etc. In any case, by having a cover 16 mounted to the bearing outer ring 22 as opposed to being mountable to a housing or other structure in an intended application, the entire sensor bearing assembly 10 may be "handled" (i.e., stored, moved, shipped or otherwise transported) as a single unit.

Preferably, the cover 16 further includes a plurality of pairs of ribs 74, preferably four pairs, spaced circumferentially apart about the bearing axis $A_B$ so as to define a separate pocket $P_{CL}$, between each pair of spaced-apart ribs 74. Each rib 74 extends radially outwardly from the side wall 34 and generally axially between the end wall 32 and a separate one of the flanges 31. Preferably, the two ribs 74 of each pair extends to a separate one of the flange circumferential ends 31a, 31b and are spaced circumferentially apart so as to define a smaller pocket $P_{CS}$. With such a cover structure, each mounting hole 70 is preferably disposed within a separate one of the smaller cover pockets $P_{CS}$ and each sensor 18 is mounted to the sidewall 34 within a separate one of larger cover pockets $P_{CL}$, as described in greater detail below. Thus, the ribs 44 provide a degree of protection against impact to the sensors 18 and the heads of the threaded fasteners 72.

Referring to FIGS. 1 and 4-7, the cover side wall 34 has at least one and preferably two sensor mounts 76 disposed within a separate one of the larger side wall open pockets $P_{CL}$ and configured to position a separate one of the sensors 18 with respect to the detection member 14. It must be noted that, when the sensor bearing assembly 10 is mounted in an intended application (e.g., on a conventional motor shaft 1), the cover 16 is typically vertically oriented so as to define upper and lower portions 16a, 16b (see FIGS. 1-3). As such, the sensor mounts 76 are preferably formed in the lower portion 16a of the cover 16 so as to prevent damage to the sensor(s) 18, as could occur, for example, when a machine operator steps on the cover 16 to access components or equipment located above the shaft 1. Preferably, each sensor mount 76 includes a mounting surface section 78 defined in the side wall outer surface 35B and an installation opening 80 for receiving the inner portion 68 of the sensor 18 into the cover cavity 17. The installation opening(s) 80 each extend between the sidewall inner and outer surfaces 35A, 35B, respectively, and each mounting surface section 78 is disposed adjacent to, preferably surrounding an outer end of, each installation opening 78.

Further, each mounting surface section 78 is preferably formed as a substantially flat surface within a recessed portion 79 formed in the outer surface 35B of the side wall 34. Each sensor 18 is removably attached to the mounting surface section 78 such that the inner portion 68 of the sensor 18 extends through the installation opening 76 and the sensor inner end 18a is disposed within the cover cavity 17 and is positioned generally aligned with the detection member outer surface 15. Also, each sensor mount 76 preferably includes one or more threaded holes (not indicated) for receiving threaded fasteners 82 which removably attach the sensor base 67 to the mounting surface section 78. However, the sensor 18 may be removably attached to the side wall 34 by any other appropriate means, such as for example, by a clamping device, a friction fit, etc.

Figure 7:
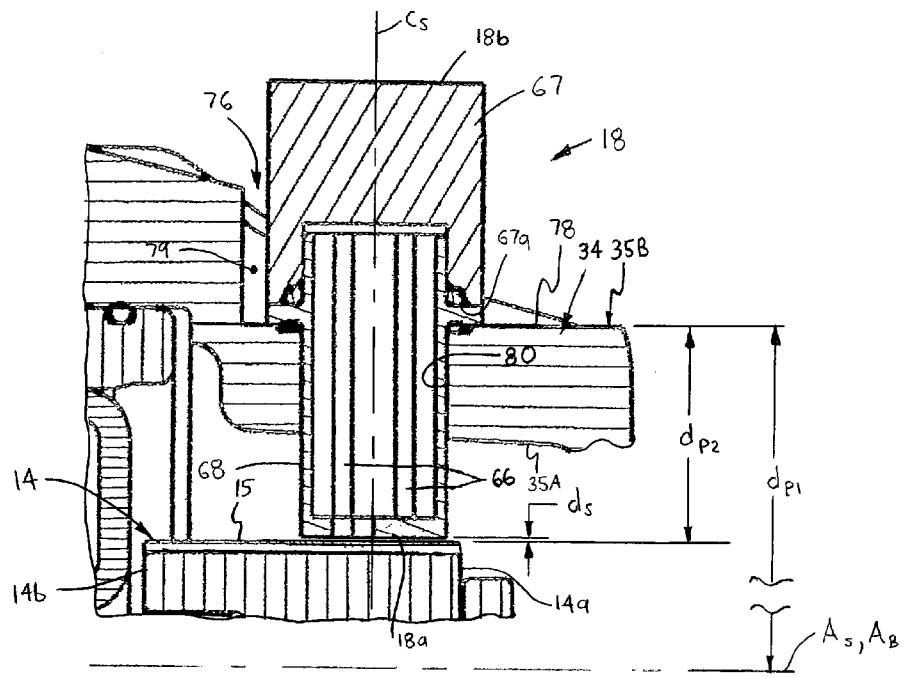
FIG. 7 is an enlarged axial cross-sectional view of the sensor assembly through line 7-7 of FIG. 6.

Furthermore, the cover 16 is preferably formed such that the perpendicular distance $d_{P1}$ from the mounting surface section 78 to the shaft and bearing axes $A_S$, $A_B$, and thus also the distance $d_{P2}$ from the surface 78 to the detection member outer surface 15, and the axial position of the installation opening 80 with respect to the axes $A_S$, $A_B$ are pre-established to position the sensor 18 at a desired location. More specifically, due to the location of the mounting surface section 78 and installation opening 80, the sensor inner end 18a is disposed generally between the detection member axial ends 14a, 14b and is spaced radially from the detection member outer surface 35B by a predetermined distance $d_S$ when the sensor 18 is attached to the cover mounting surface section 78, as indicated in FIG. 7. As such, each sensor 18 may be installed at the correct position with respect to the detection member 14 by merely inserting the sensor inner portion 68 through the installation opening 70 and attaching the sensor base 67 to the mounting surface section 78. Further, being mounted on the external cover 18, the one or more sensors 18 are readily accessible for installation and/or repair. Thus, the structure of the cover 16 provides the benefit of easy installation and replacement of the sensors 18, as well as providing a measure of protection to the sensors 18 during use of the device (none shown) of which the shaft 1 is a component.

Referring to FIGS. 2-5, the sensor bearing assembly 10 preferably further includes inner and outer seals 90, 92, respectively, disposed between the inner and outer rings 20, 22. The seals 90, 92 are configured to contain lubricant within the bearing 12 and to prevent contaminants from contacting the rolling elements 24.

Referring now to FIGS. 1-3, with the structure as described above, the present sensor bearing assembly 10 is mounted on the shaft 1 generally in the following manner. The bearing 12 is installed about the end 1a of the shaft 1, and if not already installed, the detection member 14 is then mounted on the extension portion 21 of the bearing inner ring 20. Then, the end cap 36 is inserted into the bore 27 of the inner ring 20, coupled with the inner ring extension portion 21 by the retainer 37, and attached to the shaft end 1a by threaded fasteners (none shown). Alternatively, the end cap 36 may be installed within the bearing inner ring 20 prior to installing the bearing 12 on the shaft 1. In either case, the cover 16 is then connected with the bearing 10 by using the threaded fasteners 72 to attach the cover rim 30 to the flange 23 of the bearing outer ring 22. The sensor(s) 18 may then be installed on the cover side wall 34 or may be installed prior to attaching the cover 16 to the bearing 12, the result in either case being that the sensors 18 are located as desired with respect to the detection member 14 due to the structure of the cover 16 as described in detail above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A sensor bearing assembly for supporting a shaft, the shaft being rotatable about a central axis and having a shaft axial end, the sensor bearing assembly comprising:

a bearing including an outer ring and an inner ring, the inner ring having first and second axially extending surfaces which face the outer ring and are separated by a radially extending surface such that a portion of the inner ring forms a step, the inner ring configured to be disposable about the shaft to mount the sensor bearing assembly upon the shaft, the outer ring disposed about the inner ring, and a plurality of rolling elements disposed between the inner and outer rings;

a detection member coupled with the inner ring and having an outer circumferential surface, the detection member being generally annular and having a radial shoulder on an inner circumferential surface configured to abut the radially extending surface of the step of the inner ring;

a cover being generally circular and configured to enclose the shaft axial end when the sensor bearing assembly is mounted on the shaft, the cover including a rim coupled with the outer ring, a cover end wall spaced axially from the shaft axial end and being generally radially-extending, and a cover side wall being generally annular and extending generally axially between the cover end wall and the rim; and at least one sensor mounted to the cover side wall, having an inner end spaced radially outwardly from the outer circumferential surface of the detection member such that a radial innermost portion of the at least one sensor has a first radial distance from the central axis that is greater than a second radial distance as measured from the central axis to the outer circumferential surface of the detection member, and the at least one sensor being configured to sense angular displacement of the detection member about the central axis of the shaft.

2. The sensor bearing assembly as recited in claim 1 wherein the cover end wall is generally circular and has a circular outer perimeter, the cover side wall is generally tubular and has a first axial end connected with the circular outer perimeter of the cover end wall and an opposing second axial end, and the rim includes at least one flange extending radially outwardly from the opposing second axial end of the cover side wall.

3. The sensor bearing assembly as recited in claim 2 wherein the outer ring has a radially-outwardly extending annular flange and at least a portion of the at least one flange of the cover is attached to the radially-outwardly extending annular flange of the outer ring.

4. The sensor bearing assembly as recited in claim 1 wherein the cover side wall has an inner circumferential surface defining a cavity, an opposing outer circumferential surface, an installation opening extending between the inner and outer circumferential surfaces and having an outer end, and a mounting surface section defined in the outer circumferential surface of the cover side wall and located adjacent to the outer end of the installation opening, the at least one sensor being removably attached to the mounting surface section such that a portion of the at least one sensor extends through the installation opening and the inner end of the at least one sensor is disposed within the cavity and is positioned generally aligned with the outer circumferential surface of the detection member.

5. The sensor bearing assembly as recited in claim 4 wherein the detection member is disposed within the cavity, the installation opening and the mounting surface section each being located on the cover such that the inner end of the at least one sensor is generally centered between first and second detection member axial ends and is spaced radially from the outer circumferential surface of the detection member by a predetermined distance when the at least one sensor is attached to the mounting surface section.

6. The sensor bearing assembly as recited in claim 1 further comprising a generally circular end cap connectable with the shaft axial end and at least partially disposed within the detection member, wherein the inner end of the at least one sensor comprises first and second sensor axial ends that are both configured to be located between first and second detection member axial ends, the generally circular end cap configured to directly contact the inner ring and the first detection member axial end, the first detection member axial end being spaced from the second detection member axial end in a direction axially away from the plurality of rolling elements such that the first and second detection member axial ends are located on opposite sides of the radially extending surface of the step of the inner ring.

7. The sensor bearing assembly as recited in claim 1 wherein the cover defines an internal cavity, the inner ring has an axial end portion disposed within the internal cavity, and the detection member is disposed about the axial end portion of the inner ring.

8. The sensor bearing assembly as recited in claim 1 wherein the at least one sensor has an outer end spaced radially outwardly from the inner end and a centerline extending generally radially between the inner and outer ends, the centerline generally intersecting the central axis of the shaft.

9. The sensor bearing assembly as recited in claim 1 wherein: the detection member has a plurality of indicators spaced circumferentially about the outer circumferential surface, each of the plurality of indicators corresponding to a separate angular position of the detection member about the central axis; and
the at least one sensor is configured to generate an output when any one of the plurality of indicators is disposed adjacent to a sensing face.

10. The sensor bearing assembly as recited in claim 9 wherein the plurality of indicators includes one of a plurality of pairs of north and south magnetic poles, a toothed wheel, and an optical pattern of alternating transparent and opaque areas.

11. The sensor bearing assembly as recited in claim 1 wherein the cover includes upper and lower portions and the cover side wall has at least one sensor mount configured to position the at least one sensor with respect to the detection member, the at least one sensor mount being located on the lower portion of the cover, the at least one sensor being removably attached to the at least one sensor mount.

12. The sensor bearing assembly as recited in claim 1 wherein the cover further includes a plurality of ribs extending radially outwardly from the cover side wall and generally axially between the cover end wall and the rim, the plurality of ribs being spaced circumferentially about the central axis so as to define a separate pocket between each pair of adjacent ribs, the at least one sensor being mounted to the cover side wall within one of the pockets.

13. A sensor bearing assembly for supporting a shaft, the shaft being rotatable about a central axis and having a shaft axial end, the sensor bearing assembly comprising:
a bearing including an inner ring disposable about the shaft to mount the sensor bearing assembly upon the shaft, an outer ring disposed about the inner ring, and a plurality of rolling elements disposed between the inner and outer rings;
a detection member coupled with the inner ring and having an outer circumferential surface, the detection member being generally annular;
a cover being generally circular and configured to enclose the shaft axial end when the sensor bearing assembly is mounted on the shaft, the cover including a rim coupled with the outer ring, a cover end wall spaced axially from the shaft axial end and being generally radially-extending, and a cover side wall being generally annular and extending generally axially between the cover end wall and the rim;
wherein the cover end wall is generally circular and has a circular outer perimeter, the cover side wall is generally tubular and has a first axial end connected with the circular outer perimeter of the cover end wall and an opposing second axial end, and the rim includes at least one flange extending radially outwardly from the opposing second axial end of the cover side wall;
at least one sensor mounted to the cover side wall, having an inner end spaced radially outwardly from the outer circumferential surface of the detection member and configured to sense angular displacement of the detection member about the central axis of the shaft, the sensor further comprising a sensor main body configured to be attached to the cover side wall;
the cover further includes a plurality of ribs extending radially outwardly from the cover side wall and generally axially between the cover end wall and the rim, the plurality of ribs being spaced circumferentially about the central axis so as to define a separate pocket between each pair of adjacent ribs, the at least one sensor being mounted to the cover side wall within one of the pockets such that, when viewing an axial-cross section of the sensor bearing assembly as taken through the sensor main body, first and second generally radially extending sensor main body side walls are at least partially overlapped by each of the pair of adjacent ribs.

14. The sensor bearing assembly as recited in claim 13, wherein the cover side wall has at least one sensor mount configured to position the at least one sensor with respect to the detection member, the at least one sensor being removably attached to the at least one sensor mount.

15. The sensor bearing assembly as recited in claim 14 wherein:
the cover side wall has an inner circumferential surface defining a cavity and an opposing outer circumferential surface;
each of the at least one sensor mounts includes a mounting surface section defined in the outer circumferential surface of the cover side wall and an installation opening extending between the inner and outer circumferential surfaces, the mounting surface section being adjacent to an outer end of the installation opening; and
the at least one sensor is removably attached to the mounting surface section such that a portion of the at least one sensor extends through the installation opening and the inner end of the at least one sensor is disposed within the cavity and positioned generally aligned with the outer circumferential surface of the detection member.

16. The sensor bearing assembly as recited in claim 15 wherein the detection member is disposed within the cavity, the installation opening and the mounting surface section each being located on the cover such that the inner end of the at least one sensor is generally centered between first and second detection member axial ends and is spaced radially from the outer circumferential surface of the detection member by a predetermined distance when the at least one sensor is attached to the cover mounting surface section.

17. The sensor bearing assembly as recited in claim 14 wherein the at least one sensor has an outer end spaced radially outwardly from the inner end and a centerline extending generally radially between the inner and outer ends, the centerline generally intersecting the central axis.

18. The sensor bearing assembly as recited in claim 14 wherein:
the detection member has a plurality of indicators spaced circumferentially about the outer circumferential surface, each of the plurality of indicators corresponding to a separate angular position of the detection member about the central axis; and
the at least one sensor is configured to generate an output when any one of the plurality of indicators displaces adjacent to a sensing face.

19. A sensor bearing assembly for supporting a shaft, the shaft being rotatable about a central axis and having a shaft axial end, the sensor bearing assembly comprising:
a bearing including an inner ring disposable about the shaft to mount the sensor bearing assembly upon the shaft, an outer ring disposed about the inner ring, and a plurality of rolling elements disposed between the inner and outer rings;
a detection member coupled with the inner ring;
a cover configured to enclose the shaft axial end when the sensor bearing assembly is mounted on the shaft, the cover including a cover end wall spaced axially from the shaft axial end and being generally radially-extending, a cover side wall being generally axially extending and having first and second side wall axial ends, wherein the first side wall axial end is attached to a cover end wall radial end, and at least one flange extending radially outwardly from the second side wall axial end such that the at least one flange is located radially outwardly of the cover end wall radial end with respect to the central axis;
a sensor mounted to the cover side wall and configured to sense angular displacement of the detection member, the sensor further comprising a sensor main body configured to be attached to the cover side wall;
the cover further includes a plurality of ribs extending generally from the first side wall axial end to a flange outer radial end, the plurality of ribs being spaced circumferentially about the central axis so as to define a pocket between adjacent ribs, the sensor being mounted to the cover side wall within the pocket such that the sensor does not contact the plurality of ribs and such that, when viewing an axial-cross section of the sensor bearing assembly as taken through the sensor main body, first and second generally radially extending sensor main body side walls are at least partially overlapped by each of the adjacent plurality of ribs.

20. The sensor bearing assembly as recited in claim 19 wherein the cover side wall has a mounting surface section configured to receive the sensor, the mounting surface section is within a recessed portion in an outer circumferential surface of the cover side wall such that the mounting surface section is radially inward with respect to the outer circumferential surface of the cover side wall,
the sensor being removably attached to the mounting surface section by at least one fastener, wherein the at least one fastener is radially within the recessed portion such that an outer radial surface of the at least one fastener is radially inward with respect to an outer radial recess surface,
and wherein at least one outer ring fastener attaches the cover to the outer ring, the at least one outer ring fastener being mounted to the at least one flange within the pocket such that, when viewing an axial-cross section of the sensor bearing assembly as taken through the at least one outer ring fastener, the at least one outer ring fastener is at least partially overlapped by each of the adjacent plurality of ribs.

* * * * *